United States Patent [19]

Amimoto et al.

[11] Patent Number: 5,424,104
[45] Date of Patent: Jun. 13, 1995

[54] THERMOPLASTIC RESIN COMPOSITION AND USE THEREOF

[75] Inventors: Yoshikatsu Amimoto; Fumitoshi Ikejiri; Sanehiro Yamamoto; Akinori Toyota; Katunari Nishimura, all of Yamaguchi; Masahiro Kanda; Tetsuo Kato, both of Shizuoka, all of Japan

[73] Assignee: Mitsui Petrochemical Industries, Ltd., Tokyo, Japan

[21] Appl. No.: 178,616

[22] Filed: Jan. 7, 1994

Related U.S. Application Data

[62] Division of Ser. No. 801,505, Nov. 27, 1991, abandoned.

[30] Foreign Application Priority Data

Nov. 30, 1990 [JP] Japan ................................. 2-339331

[51] Int. Cl.⁶ ....................... B29D 22/00; B29D 23/00
[52] U.S. Cl. ........................................ 428/36.8; 525/66
[58] Field of Search ........................... 525/66; 428/36.8

[56] References Cited

U.S. PATENT DOCUMENTS

| | | | |
|---|---|---|---|
| 4,923,925 | 5/1990 | Chiba et al. | 525/66 |
| 5,071,924 | 12/1991 | Koch et al. | 525/432 |

FOREIGN PATENT DOCUMENTS

| | | |
|---|---|---|
| 0397531 | 11/1990 | European Pat. Off. |
| 63-179960 | 7/1988 | Japan . |
| 01311580 | 12/1989 | Japan . |
| 01313555 | 12/1989 | Japan . |

*Primary Examiner*—Ana L. Carrillo
*Attorney, Agent, or Firm*—Sherman and Shalloway

[57] ABSTRACT

Disclosed is a thermoplastic resin composition comprising (A) an aromatic polyamide comprising
  dicarboxylic acid units comprising 50–100 mol % of units derived from terephthalic acid, and 0–50 mol % of units derived from an aromatic dicarboxylic acid other than terephthalic acid and/or an aliphatic-dicarboxylic acid having 4–20 carbon atoms, and
  diamine units derived from an aliphatic diamine and/or an alicyclic diamine,
  said aromatic polyamide having an intrinsic viscosity of 0.5–3.0 dl/g as measured in conc. sulfuric acid at 30° C. and a melting point of higher than 300° C.,
(B) a graft modified α-olefin polymer, and/or a graft modified aromatic vinyl hydrocarbon/conjugated diene copolymer or hydrogenated product thereof, and
(C) an aliphatic polyamide,
  wherein said thermoplastic resin composition comprises 10–80 parts by weight of the graft modified α-olefin polymer, and/or the graft modified aromatic vinyl hydrocarbon/conjugated diene copolymer or hydrogenated product thereof (B) and 5–80 parts by weight of the aliphatic polyamide (C), based on 100 parts by weight of the aromatic polyamide (A).

4 Claims, No Drawings

THERMOPLASTIC RESIN COMPOSITION AND USE THEREOF

This application is a continuation-in-part, continuation, division of application Ser. No. 07/801,505, filed Nov. 27, 1991, now abandoned.

FIELD OF THE INVENTION

The present invention relates to a novel thermoplastic resin composition, and its use for connectors. The present invention relates more in detail to a thermoplastic resin composition particularly suitable for the preparation of molded articles such as connectors especially for automobiles exhibiting a lowered toughness decrease when heated.

BACKGROUND OF THE INVENTION

Connectors used as connection terminals, etc., of electric circuits have heretofore been manufactured from thermosetting resins such as phenol resins. However, thermoplastic resins which can be easily molded have recently come to be used in place of the thermosetting resins. Such thermoplastic resins include aliphatic polyamides such as polycapramide (nylon 6) and polyhexamethyleneadipamide (nylon 66).

Such aliphatic polyamides, however, have a high water absorption, and as a result those connectors molded from the aliphatic polyamides vary their dimension and electric resistance when they absorb water. There has been such a problem that the connectors cannot easily be installed in devices when a warpage is formed in the connectors.

Aromatic polyamides have also been known as polyamides in addition to the aliphatic polyamides as mentioned above. The aromatic polyamides comprise aromatic dicarboxylic acid recurring units as dicarboxylic acid recurring units, and are obtained by the polycondensation of aromatic dicarboxylic acid and diamine.

In contrast with the aliphatic polyamides, the aromatic polyamides have a low water absorption. Accordingly, there can be solved the above-mentioned problems such as lowering of dimensional accuracy and variation in electric resistance of connectors caused by their water absorption when the aromatic polyamides are used.

Further detailed investigation of the connectors molded from the aromatic polyamides, however, has revealed that the aromatic polyamides are sometimes thermally deteriorated when the connectors are exposed to a high temperature. As the result of the thermal deterioration, the connectors sometimes lower their toughness. Those connectors having lowered their toughness come to have a decreased stretchability, and as a result there arises a problem that the connectors cannot be smoothly installed in devices.

Recently, electronic parts such as connectors are often installed in devices by soldering using an IR-ray reflow method, etc., and a decrease in toughness of the connectors caused by heating induces lowering of operability in the assemblage step of devices and a decrease in durability thereof. The connectors especially tend to lower their toughness when used repeatedly heating and cooling, such as in automobile engine rooms.

Under these circumstances, various attempts have been made to improve the drawbacks of the polyamides as mentioned above. A composition disclosed in Japanese Patent L-O-P No. 144362/1985 can be mentioned as an example of the improved aromatic polyamide. Concretely, the composition comprises aromatic polyamide and specific modified α-olefin elastic polymer.

The aromatic polyamide composition disclosed above is designed for general-purpose articles with repect to heat resistance. The properties of molded articles such as automobile connectors exposed to a very high temperature were not considered.

An attempt has also been made to improve the properties of aromatic polyamides by incorporating aliphatic polyamides thereinto (refer to, for example, Japanese Patent L-O-P No. 57458/1987).

Such incorporation of aliphatic polyamides-into the aromatic polyamides, however, has proved to be relatively ineffective in decreasing toughness lowering caused by heating molded articles formed therefrom.

OBJECT OF THE INVENTION

An object of the present invention is to provide a thermoplastic resin composition capable of forming molded articles tending not to lower their toughness when heated, and having excellent impact strength and heat resistance. A further object of the present invention is to provide a thermoplastic resin composition especially suitable for forming connectors.

SUMMARY OF THE INVENTION

A first embodiment of thermoplastic resin composition of the present invention comprises (A) an aromatic polyamide comprising
  dicarboxylic acid units comprising 50-100 mol % of units derived from terephthalic acid, and 0-50 mol % of units derived from an aromatic dicarboxylic acid other than terephthalic acid and/or an aliphatic dicarboxylic acid having 4-20 carbon atoms, and
  diamine units derived from an aliphatic diamine and/or an alicyclic diamine,
  said aromatic polyamide having an intrinsic viscosity of 0.5-3.0 dl/g as measured in conc. sulfuric acid at 30° C. and a melting point of higher than 300° C., (B) a graft modified -olefin polymer, and/or a graft modified aromatic vinyl hydrocarbon/conjugated diene copolymer or hydrogenated product thereof, and (C) an aliphatic polyamide,
wherein said thermoplastic resin composition comprises 10-80 parts by weight of the graft modified α-olefin polymer, and/or the graft modified aromatic vinyl hydrocarbon/conjugated diene copolymer or hydrogenated product thereof (B) and 5-80 parts by weight of the aliphatic polyamide (C), based on 100 parts by weight of the aromatic polyamide (A).

A second embodiment of thermoplastic resin composition of the present invention comprises (A) an aromatic polyamide comprising
  dicarboxylic acid units comprising 50-100 mol % of units derived from terephthalic acid, and 0-50 mol % of units derived from an aromatic dicarboxylic acid other than terephthalic acid and/or an aliphatic dicarboxylic acid having 4-20 carbon atoms, and
  diamine units derived from an aliphatic diamine and/or an alicyclic diamine,
  said aromatic polyamide having an intrinsic viscosity of 0.5-3.0 dl/g as measured in conc. sulfuric acid at 30° C. and a melting point of higher than 300° C.,
(B) a graft modified α-olefin polymer, and/or a graft modified aromatic vinyl hydrocarbon/conjugated diene copolymer or hydrogenated product thereof,
(C) an aliphatic polyamide, and
(D) a phosphorus antioxidant
wherein said thermoplastic resin composition comprises 10-80 parts by weight of the graft modified α-olefin polymer, and/or the graft modified aromatic vinyl hydrocarbon/conjugated diene copolymer or the hydrogenated product thereof (B) and 5-80 parts by weight of the aliphatic polyamide (C), based on 100 parts by weight of the aromatic polyamide (A), and 0.05-2 parts by weight of the phosphorus type antioxidant (D) based on 100 parts by weight of the total sum of the components (A), (B) and (C).

Furthermore, the present invention provides a thermoplastic resin composition for connectors comprising the first or second thermoplastic resin composition.

The thermoplastic resin composition of the invention is capable of forming molded articles excellent in heat resistance and mechanical properties especially impact strength.

Connectors molded from these resin compositions come to have such characteristics as tending not to lower their toughness, for example, even when they are exposed to 150° C. or more over a long period of time.

DETAILED DESCRIPTION OF THE INVENTION

The thermoplastic resin composition of the invention is concretely illustrated hereinafter.

The first embodiment of thermoplastic resin composition of the invention comprises a specific aromatic polyamide (A), a specific graft modified α-olefin polymer (B) and an aliphatic polyamide (C) as shown below.

The aromatic polyamide (A) of the composition of the invention comprises
specific dicarboxylic acid units [a], and specific diamine units [b].

The dicarboxylic acid units [a] of the polyamide comprise terephthalic acid units (a-1) as essential recurring units. The recurring units containing terephthalic acid units (a-1) can be represented by the formula

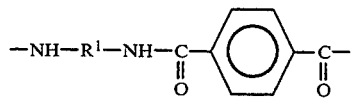
[I-a]

wherein $R^1$ represents a bivalent hydrocarbon group, preferably an alkylene group having 4 to 18 carbon atoms.

The dicarboxylic acid units [a] are not required to be entirely composed of the terephthalic acid units represented in the above-mentioned formula [I-a], but may contain other dicarboxylic acid units in place of part of the terephthalic acid units (a-1) as described above.

The dicarboxylic acid units other than terephthalic acid units include aromatic dicarboxylic acid units (a-2) other than terephthalic acid units and aliphatic dicarboxylic acid units (a-3).

Examples of the aromatic dicarboxylic acid units (a-2) other than terephthalic acid units include isophthalic acid units, 2-methylterephthalic acid units and naphthalenedicarboxylic acid units. When the polyamide used in the present invention contains acid units derived from an aromatic dicarboxylic acid other than terephthalic acid, isophthalic acid units are particularly preferable.

The recurring units comprising the isophthalic acid units in the invention can be represented by the formula

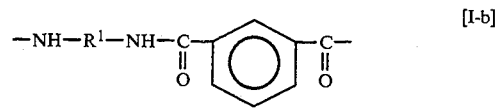
[I-b]

wherein $R^1$ represents a bivalent hydrocarbon group, preferably an alkylene group having 4 to 18 carbon atoms.

The aliphatic dicarboxylic acid units (a-3) are derived from an aliphatic dicarboxylic acid having an alkylene group of usually 4 to 20 carbon atoms, preferably 6 to 12 carbon atoms. Examples of the aliphatic dicarboxylic acid used for deriving the aliphatic dicarboxylic acid units (a-3) include succinic acid, adipic acid, azelaic acid and sebacic acid.

When the polyamide of the invention contains aliphatic dicarboxylic acid units, particularly preferable as the acid units are adipic acid units and sebacic acid units.

The recurring units containing the aliphatic dicarboxylic acid units (a-3) can be represented by the formula

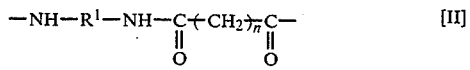
[II]

wherein $R^1$ is as defined above, n is an integer of usually 2 to 18, preferably 4 to 10.

As described above, the recurring units of the present polyamide comprise the dicarboxylic acid units [a] and diamine units [b].

The diamine units [b] can be derived from an aliphatic alkylenediamine having 4 to 18 carbon atoms and/or an alicyclic diamine.

Concrete examples of the aliphatic alkylenediamine units can be derived from 1,4-diaminobutane, 1,6-diaminohexane, trimethyl-1, 6-diaminohexane, 1,7-diaminoheptane, 1,8-diaminooctane, 1,9-diaminononane, 1,10-diaminodecane, 1,11-diaminoundecane and 1,12-diaminododecane. Moreover, concrete examples of the alicyclic diamine can be derived from diaminocyclohexane.

Of these, preferred are 1,6-diaminohexane, 1,8-diaminooctane, 1,10-diaminodecane, 1,12-diamonododecane and mixtures of these. Furthermore, of these, 1,6-diaminohexane is particularly preferred.

The dicarboxylic acid units (100 mol %) of the aromatic polyamide (A) comprise 50-100 mol % of the terephthalic acid units (a-1), 0-50 mol % of the aromatic dicarboxylic acid units (a-2) other than terephthalic acid units and/or the aliphatic dicarboxylic acid units (a-3).

Furthermore, the dicarboxylic acid units may also comprise units derived from a polybasic carboxylic acid having a basicity of at least three, such as trimellitic acid or pyromellitic acid in a small amount in addition to the above-mentioned recurring units. The amount of such a polybasic carboxylic acid units is usually 0 to 5 mol %.

The aromatic polyamide used in the invention has an intrinsic viscosity $[\eta]$, as measured in conc. sulfuric acid at 30° C., of usually 0 5 to 3.0 dl/g, preferably 0.5 to 2.8 dl/g and especially 0.6 to 2.5 dl/g. The content of an amino group in the aromatic polyamide of the invention is usually 0.04 to 0.2 mill equivalent/g, preferably 0,045 to 0.15 mill equivalent/g and especially 0.05 to 0.1 mill equivalent/g as quantitatively determined by neutralizing titration with p-toluenesulfonic acid in a m-cresol solution.

Still furthermore, the aromatic polyamide (A) used in the present invention may be a mixture of an aromatic polyamide comprising recurring units represented by the above formula [I-a] as main recurring units, and an aromatic polyamide comprising recurring units represented by the above formula [1-b] as main recurring units In this case, the amount of the aromatic polyamide comprising recurring units represented by the formula [I-a] as main recurring units is usually at least 50% by weight, preferably at least 60% by weight The aromatic polyamide used in the invention has a melting point higher than that of conventionally used aliphatic polyamides. That is to say, the aromatic polyamide used in the invention has a melting point exceeding 300° C. Those aromatic polyamides having a melting point of preferably 305° to 340° C., more preferably 310° to 340° C. are significantly excellent in heat resistance Moreover, the amorphous part of the aromatic polyamide used in the invention has a glass transition temperature of usually 80° C. or more.

Molded articles formed from a thermoplastic resin composition containing the aromatic polyamide having a melting point and a glass transition temperature at its amorphous part in the range as mentioned above are prevented from becoming in a molten state even when exposed to high temperature. Further, the aromatic polyamide as described above has excellent moldability, and therefore manufacture of molded articles becomes easy when the aromatic polyamide is used In addition, the aromatic polyamide has a glass transition temperature of at least 80° C. at its amorphous part, and as a result tends to form no cracks.

The aromatic polyamide as described above has a specific structure, and accordingly shows a low water absorption, whereas conventional aliphatic polyamides show a high water absorption.

It has been found that the aromatic polyamide as mentioned above tends to have low toughness compared with aliphatic polyamides, though the aromatic polyamide is excellent in heat resistance and water abosorption. That is, there arise such problems that molded articles obtained from the aromatic polyamide have insufficient elongation and are brittle. Automobile parts are in particular required to have a high reliability level, and therefore it is an important point to improve the toughness of the aromatic polyamide.

The resin composition of the invention comprises a graft modified α-olefin polymer and/or a graft modified aromatic vinyl hydrocarbon/conjugated diene copolymer or hydrogenated product (B) thereof.

The graft modified α-olefin polymers used in the present invention include a graft modified product of a crystalline polyolefin, and a graft modified α-olefin random elastic copolymer.

Examples of the crystalline polyolefin used for the preparation of the graft modified product of a crystalline polyolefin include homopolymers of α-olefins having 2 to 20 carbon atoms and copolymers of these α-olefins. Concrete examples of the crystalline polyolefin include polyethylene, polyproylene, linear low density polyethylene (LLDPE), very low density linear polyethylene (VLDPE), polybutene-1, polypentene-1, poly-3-methylbutene-1 and poly-4-methylpentene-1. Those polyolefins mentioned above have a relatively high crystallinity.

The graft modified α-olefin polymers can be obtained by graft modifying the crystalline polyolefins by a procedure similar to that described later.

The graft modified α-olefin random elastic copolymer used in the invention is a graft modified product of a copolymer in which two kinds of recurring units derived from different α-olefins are randomly arranged.

The graft modified α-olefin random elastic copolymer is a low crystalline or amorphous copolymer, and is preferably substantially amorphous. That is, the copolymer has a crystallinity of not greater than 10%, preferably not greater than 5% and especially 0% as measured by X-ray diffraction. Accordingly, many of the graft modified α-olefin random elastic copolymers show no definite melting point. Moreover, as a result of the low crystallinity, the graft modified α-olefin random elastic copolymers are soft. The elastic copolymer has a tensile modulus of usually at least 0.1 to less than 20000 $kg/cm^2$, preferably 1 to 15000 $kg/cm^2$.

The graft modified α-olefin random elastic copolymer has a melt index of usually 0.1 to 30 g/10 rain, preferably 1.0 to 20 g/10 min and especially 2.0 to 15 g/10 min as measured at 190° C. Further, the copolymer has a Mw/Mn ratio of usually not greater than 5.5, preferably not greater than 4.5 and especially not greater than 3.5 as measured by GPC.

Furthermore, the graft modified α-olefin random elastic copolymer has a glass transition temperature (Tg) of usually −150° to +50° C., preferably −80 to −20° C., an intrinsic viscosity $[\eta]$ of usually 0.2 to 10 dl/g, preferably 1 to 5 dl/g as measured in decalin at 135° C., and a density of usually 0.82 to 0.96 $g/cm^3$, preferably 0.84 to 0.92 $g/cm^3$.

Concrete examples of the graft modified α-olefin random elastic copolymer having properties as described above include a graft modified ethylene/α-olefin copolymer rubber (i), and a graft modified propylene/α-olefin copolymer rubber (ii).

The graft modified ethylene/α-olefin copolymer rubber (i) and graft modified propylene/α-olefin copolymer rubber (ii) are illustrated more in detail below as typical examples of the graft modified α-olefin random elastic copolymer described above.

α-Olefin having usually 3 to 20 carbon atoms is used as the α-olefin of the above-mentioned graft modified ethylene/α-olefin copolymer rubber (i) . Examples of the αolefin include propylene, butene-1, pentene-1, hexene-1, 4-methylpentene-1, octene-1, decene-1 and mixtures of the these compounds. Of these compounds, propylene and/or butene-1 are particularly preferable.

α-Olefin having usually 4 to 20 carbon atoms is used as the α-olefin of the above-mentioned graft modified propylene/α-olefin copolymer rubber (ii). Examples of the α-olefin include butene-1, pentene-1, hexene-1, 4-methylpentene-1, octene-1, decene-1 and mixtures of these compounds. Of these compounds, butene-1 is particularly preferable.

In the graft modified ethylene/α-olefin copolymer rubber (i) as mentioned above, the molecular ratio (ethylene/α-olefin) of ethylene to α-olefin is generally 10/90 to 99/1, preferably 50/50 to 95/5, though the molecular ratio differs depending on the kind of α-olefin. The molecular ratio is preferably 50/50 to 90/10 when the α-olefin is propylene, and 80/20 to 95/5 when the α-olefin has at least 4 carbon atoms.

Examples of the ethylene/α-olefin copolymer used for the graft modified ethylene/α-olefin copolymer rubber (i) include binary copolymers such as ethylene/propylene copolymer, ethylene/butene-1 copolymer, ethylene/4-methylpentene-1 copolymer, ethylene/hexene-1 copolymer, ethylene/octene-1 copolymer and ethylene/decene-1 copolymer; and terpolymer copolymers such as ethylene/propylene/1,4-hexadiene copolymer, ethylene/propylene/dicyclopentadiene copolymer, ethylene/propylene/5-ethylidene-2-norbornene copolymer, ethylene/propylene/2,5-norbornadiene copolymer, ethylene/butene-1/dicyclopentadiene copolymer, ethylene/butene-1/1,4-hexadiene copolymer and ethylene/butene-1/5-ethylidene-2-nobornene copolymer.

In the graft modified propylene/α-olefin copolymer rubber (ii), the molecular ratio (propylene/α-olefin) of propylene to α-olefin is preferably 50/50 to 95/5, though the molecular ratio differs depending on the kind of olefin. The molecular ratio is preferably 50/50 to 90/10 when the α-olefin is butene-1, and 80/20 to 95/5 when the α-olefin has at least 5 carbon atoms.

The α-olefin random copolymer may contain recurring units other than those derived from α-olefin, for example, recurring units derived from a diene so long as the recurring units do not impair the characteristics of the α-olefin random elastic copolymer.

Examples of recurring units allowed to be contained in the α-olefin random elastic copolymer include recurring units derived from a chain nonconjugated diene such as 1,4-hexadiene, 1,6-octadiene, 2-methyl-1, 5-hexadiene, 6-methyl-1,5-heptadiene and 7-methyl-1,6-octadiene;

recurring units derived from a cyclic nonconjugated diene such as cyclohexadiene, dicyclopentadiene, methyltetrahydroindene, 5-vinylnorbornene, 5-ethylidene-2-norbornene, 5-methylene-2-norbornene, 5-isopropylene-2-norbornene and 6-chloromethyl-5-isopropenyl-2-norbornene;

recurring units derived from a diene compound such as 2,3-diisopropylidene-5-norbornene, 2-ethylidene-3-isopropylidene-5-norbornene and 2-propenyl-2,2-norbornadiene; and recurring units derived from a cycloolefin. The α-olefin random elastic copolymer contains the diene recurring units as mentioned above in an amount of usually not greater than 10 mol %, preferably not greater than 5 mol %.

The graft modified α-olefin random elastic copolymer used in the present invention is prepared by graft modifying such an α-olefin random elastic copolymer as described above with an unsaturated carboxylic acid, an unsaturated carboxylic acid anhydride or an unsaturated carboxylic acid derivative.

Examples of the unsaturated carboxylic acid used herein include acrylic acid, methacrylic acid, α-ethylacrylic acid, maleic acid, fumaric acid, itaconic acid, citraconic acid, tetrahydrophthalic acid, methyltetrahydrophthalic acid, endo-cis-bicyclo[2.2.1]hept-5-en-2,5-dicarboxylic acid (trade name of nadic acid) and methyl-endo-cis-bicyclo[2.2.1]hept-5-en-2,5-dicarboxylic acid (trade name of methylnadic acid). Suitable examples of the unsaturated carboxylic acid anhydride include maleic anhydride, citraconic anhydride, nadic anhydride and methylnadic anhydride. Moreover, examples of the unsaturated carboxylic acid derivative include halides (e.g., maleyl chloride), imides (e.g., maleimide) and esters (e.g., monomethyl maleate, dimethyl maleate and glycidyl maleate) of the above-mentioned unsaturated carboxylic acids.

The graft modifiers as mentioned above can be used singly or in combination.

Of the graft modifiers described above, preferred are unsaturated carboxylic anhydrides, and particularly preferred is maleic anhydride or nadic anhydride.

Examples of the method for graft polymerizing the α-olefin random elastic copolymers as mentioned above with the graft modifiers include a method (solution method) wherein an α-olefin random elastic copolymer is suspended or dissolved in a solvent, and graft polymerization is carried out by adding a graft modifier to the suspension or solution, and a method (melting method) wherein grafting reaction is carried out by melting a mixture of an α-olefin random elastic copolymer and a graft modifier.

In such grafting reactions, the amount of graft modifiers to be used is determined in view of the reactivity thereof. In general, the graft modifier is used in an amount of 1 to 10 parts by weight based on 100 parts by weight of the α-olefin random elastic copolymer.

When the grafting reaction as described above is carried out, there can be obtained a graft modified α-olefin random elastic copolymer containing the graft polymerized graft modifier in an amount of usually 0.01 to 10 parts by weight, preferably 0.05 to 5 parts by weight based on 100 parts by weight of the α-olefin random elastic copolymer.

The grafting efficiency in the grafting reaction can be improved by the use of a radical initiator. Known radical initiators such as organic peroxides, organic peresters and azo compounds can be used as the radical initiators. The radical initiator is used in an amount of 0.01 to 20 parts by weight based on 100 parts by weight of the α-olefin random elastic copolymer.

When a substantially amorphous graft modified ethylene/propylene random copolymer rubber or graft modified ethylene/α-olefin random copolymer rubber both containing 35 to 50 mol % of ethylene recurring units is used, toughness lowering, caused by thermal deterioration, of the molded articles such as connectors can be efficiently decreased.

The graft modified aromatic vinyl hydrocarbon/conjugated diene copolymer or hydrogenated product thereof used for the composition of the invention is a graft modified product of a random copolymer or a block copolymer of an aromatic vinyl hydrocarbon and a conjugated diene. Moreover, in the present invention, there can be used a graft modified product of the hydrogenated product of these copolymers.

Concrete examples of the aromatic vinyl hydrocarbon/conjugated diene copolymer or hydrogenated product thereof used for the preparation of the modified product include styrene/butadiene block copolymer rubber, styrene/butadiene/styrene block copolymer rubber styrene/isoprene block copolymer rubber, styrene/isoprene/styrene block copolymer rubber, hydrogenated styrene/butadiene/styrene block copolymer rubber, hydrogenated styrene/isoprene/styrene block copolymer rubber and styrene/butadiene random copolymer rubber.

In these copolymers, the molecular ratio (aromatic vinyl hydrocarbon/conjugated diene) of the recurring units derived from the aromatic vinyl hydrocarbon to the recurring units derived from the conjugated diene is usually 10/90 to 70/30. In addition, the hydrogenated copolymer rubber in the invention means a copolymer having double bonds remaining in the above-mentioned copolymer rubber partly or entirely hydrogenated.

The aromatic vinyl hydrocarbon/conjugated diene copolymer or hydrogenated product thereof has an intrinsic viscosity [$\eta$] of usually 0.01 to 10 dl/g, preferably 0.08 to 7 dl/g as measured in decalin at 135° C., a glass transition temperature (Tg) of usually not higher than 0° C., preferably not higher than −10° C. and especially not higher than −20° C., and a crystallinity of 0 to 10%, preferably 0 to 7% and especially 0 to 5% as measured by an X-ray diffraction.

The graft modified aromatic vinyl hydrocarbon/conjugated diene copolymer used in the invention is prepared by graft modifying the unmodified aromatic vinyl hydrocarbon/conjugated diene copolymer with an unsaturated carboxylic acid, an unsaturated carboxylic acid anhydride or an unsaturated carboxylic acid derivative in a similar way described above for preparing the graft modified α-olefin random elastic copolymer.

Examples of the unsaturated carboxylic acid, unsaturated carboxylic acid anhydride or unsaturated carboxylic acid derivative used in graft modifying include those compounds used in the preparation of the above-mentioned graft modified α-olefin random elastic copolymer. The graft modifiers as mentioned above can be used singly or in combination.

Of these graft modifiers, preferred are the unsaturated carboxylic acid anhydrides, and particularly preferred is maleic anhydride or nadic anhydride.

The solution method and the melting method illustrated in the modification of α-olefin random elastic copolymer as described above, and other methods can be adopted for graft polymerizing the above-mentioned copolymers or hydrogenated products thereof with such graft modifiers as described above.

In the grafting reaction, the amount of the graft modifier to be used is determined in view of its reactivity. In general, the graft modifier is used in an amount of 1 to 10 parts by weight based on 100 parts by weight of the aromatic vinyl hydrocarbon/conjugated diene copolymer or hydrogenated product thereof. In the grafting reaction, radical initiators such as organic peroxides, organic peresters and azo compounds can be used as described above in the above grafting reaction.

When the grafting reaction is carried out as described above, there can be obtained a graft modified aromatic vinyl hydrocarbon/conjugated diene copolymer or hydrogenated product thereof each containing a grafted modifier in an amount of usually 0.01 to 10 parts by weight, preferably 0.05 to 5 parts by weight based on 100 parts by weight of the aromatic vinyl hydrocarbon/conjugated diene copolymer or hydrogenated product thereof.

The graft modified α-olefin polymer such as the graft modified α-olefin random elastic copolymer as mentioned above and graft modified aromatic vinyl hydrocarbon/conjugated diene copolymer or hydrogenated product thereof (B) may be a graft modified product prepared obtained by modifying the copolymer by adjusting the amounts of the unmodified polymer, modifier, etc., so that a desired modification ratio is obtained, or may be a graft modified product obtained by preparing a modified product having a high graft ratio at first, and then diluting the modified product with an unmodified polymer so that a desired graft ratio is obtained.

The graft modified aromatic vinyl hydrocarbon/conjugated diene copolymer or hydrogenated product thereof is a low crystalline or amorphous copolymer, and is preferably substantially amorphous. That is, a crystallinity of a graft modified copolymer is not greater than 10%, preferably not greater than 7% and especially not greater than 5% as measured by X-ray diffraction. Moreover, a crystallinity of a graft modified copolymer having a crystallinity of substantially 0% is preferred. Accordingly, many of the graft modified aromatic vinyl hydrocarbon/conjugated diene copolymers or hydrogenated product thereof exhibit no definite melting point. Furthermore, the graft modified aromatic vinyl hydrocarbon/conjugated diene copolymers or hydrogenated products thereof are soft due to their low crystallinity, and have a tensile modulus of usually at least 0 1 to less than 20000 kg/cm$^2$ preferably 1 to 15000 kg/cm$^2$.

In addition, the graft modified aromatic vinyl hydrocarbon/conjugated diene copolymer or hydrogenated product thereof has a melt index of usually 0.1 to 30 g/10 min, preferably 1.0 to 20 g/10 min and especially 2.0 to 15 g/10 min as measured at 190° C.

Furthermore, the graft modified aromatic vinyl hydrocarbon/conjugated diene copolymer or hydrogenated product thereof has a glass transition temperature (Tg) of usually −150 to +50° C., preferably −80° to −20° C. and an intrinsic viscosity [$\eta$] of usually 0.01 to 10 dl/g, preferably 1 to 5 dl/g as measured in decalin at 135° C.

When the graft modified aromatic vinyl hydrocarbon/conjugated diene copolymer or hydrogenated product thereof as described above is used, a decrease in toughness caused by thermal deterioration of the resulting molded articles such as connectors can be efficiently inhibited.

In the present invention, the graft modified α-olefin polymer and graft modified aromatic vinyl hydrocarbon/conjugated diene copolymer or hydrogenated product thereof (B) can be used singly or in combination.

The graft modified α-olefin polymer and/or graft modified aromatic vinyl hydrocarbon/conjugated diene copolymer or hydrogenated product thereof (B) may contain other polymers or copolymers so long as the other polymers or copolymers do not impair the characteristics of these resins.

The thermoplastic resin composition of the invention contains 5 to 80 parts by weight of the graft modified α-olefin random elastic copolymer and/or graft modified aromatic vinyl hydrocarbon/conjugated diene copolymer (B) based on 100 parts by weight of the aromatic polyamide (A). It becomes possible to obtain molded articles showing a lowered toughness decrease caused by heating especially when the composition contains the graft modified copolymer (B) in an amount of 10 to 70 parts by weight, preferably 15 to 70 parts by weight, more preferably 25 to 50 parts by weight and particularly 25 to 40 parts by weight.

The resin composition of the invention further comprises an aliphatic polyamide in addition to the above-mentioned aromatic polyamide and graft modified copolymer.

The aliphatic polyamides (C) of the resin composition in the present invention include those formed by polycondensation of aliphatic dicarboxylic acid and aliphatic diamine, those formed by ring-opening polymerization of lactam, and those formed from aliphatic dicarboxylic acid, aliphatic diamine and lactam.

The polyamides as described above generally have a structure represented by the formula $$-CH_2-CONH-CH_2-.$$

Concrete examples of the aliphatic polyamides as mentioned above include polyamides formed from aliphatic diamine and aliphatic dicarboxylic acid, such as polytetramethyleneadipamide, polyhexamethyleneadipamide, polyhexamethylenesuberamide, polyhexamethylenesebacamide, polyhexamethyleneundecamide, polyhexamethyleneundecamide and polyhxamethylenedodecamide; polyamides formed from lactam or aminocarboxylic acid, such as polycaprolactam, polyundecamide and polydodecamide.

Of these aliphatic polyamides as mentioned above, preferably are polycaprolactam, polyhexamethyleneadipamide, polyhexamethylenesperamide, polyundecamide and polydodecamide.

Furthermore, the aliphatic polyamide (C) as mentioned above has an intrinsic viscosity [$\eta$] of usually 0.3 to 4 dl/g, preferably 0.4 to 3 dl/g as measured in conc. sulfuric acid at 30° C.

The thermoplastic resin composition of the invention contains 5 to 80 parts by weight of the aliphatic polyamide (C) as mentioned above based on 100 parts by weight of the aromatic polyamide. Especially, when the content of the aliphatic polyamide is 5 to 50 parts by weight, preferably 5 to 40 parts by weight, more preferably 5 to 30 parts by weight the resin composition is able to provide molded articles showing a lowered toughness decrease when heated.

The first embodiment of the thermoplastic resin composition of the invention comprising the aromatic polyamide (A), graft modified copolymer (B) and aliphatic polyamide (C) has a heat deformation temperature (heat distortion point) of usually 70° to 150° C., preferably 80° to 120° C. as measured under a load of 18.6 kg, and therefore exhibits a very high heat resistance in spite of its thermoplasticity.

The heat resistance of the resin composition is further improved by incorporating thereinto a phosphorus antioxidant (D). That is to say, the second embodiment of the thermoplastic resin composition of the invention comprises the aromatic polyamide (A), the graft modified copolymer (B), the aliphatic polyamide (C) and a phosphorus antioxidant (D). Generally, known antioxidants to be incorporated into resins include phosphorus antioxidants, phenolic antioxidants, amine antioxidants, sulfur antioxidants and aliphatic carboxylic acid stabilizers. Of these various antioxidants, the incorporation of phosphorus antioxidants improves the impact strength of the molded articles in the present invention.

Examples of the phosphorus antioxidant (D) contained in the second embodiment of the thermoplastic resin composition of the invention include 9,10-dihydro-9-oxa-10-phosphophenanthrene- 10-oxide, triphenyl phosphite, 2-ethylhexhyl phosphate, dilauryl phosphite, triisooctyl phosphite, tris(2,4-di-tert-butylphenyl)phosphite, trilauryl phosphite, trilauryl dithiophosphite, trilauryl trithiophosphite, trisnonylphenyl phosphite, distearylpentaerythritol diphosphite, tris(mononoylphenyl) phosphite, tris(dinonylphenyl) phosphite, trioctadecyl phosphite, 1,1,3-tris (2-methyl-di-tridecyl phosphite-5-tert-butylphenyl)butane, 4,4'-butylidenebis (3-methyl-6-tert-butyl)tridecyl phosphite, 44'-butylidenebis(3-methyl-6-tert-butyl-ditridecyl)-phosphite, bis(2,4-di-ter-butylphenyl)pentaerythritol diphosphite, bis(2,4-di-tert-butylphenyl)pentaerythritol diphosphite, bis(2,6-di- tert-butyl-4-methylphenyl)pentaerythritol disphosphite, tetrakis (2,4-di-tert-butylphenyl) 4,4'-bisphenylene diphosphonite, distearylpentaerythritol diphosphite, tridecyl phosphite, tristearyl phosphite, 2,2'-methylenebis(4,6-di-tert-butylphenyl)octyl phosphite, sorbitol trisphosphite-distearyl-mono-$C_{30}$-diol ester and bis (2,4,6-tri-tert-butylphenyl)pentaerythritol diphosphite. Among these compounds, pentaerythritol diphosphite such as bis (2,4-di-tert-butylphenyl)-pentaerythritol diphosphite and bis (2,6-di-tert-butyl- 4-methylphenyl)pentaerythritol diphsophite, and tetrakis (2,4-di-tert-butylphenyl)4,4'-bisphenylene diphosphonite improve the heat resistance of molded articles when contained in the thermoplastic resin composition from which the molded articles are formed.

These phosphorus antioxidants can be used singly or in combination.

The phosphorus antioxidant (D) is used in an amount of 0.05 to 2 parts by weight based on 100 parts by weight of the total sum of the components (A), (B) and (C). The phosphorus antioxidant is used in an amount of preferably 0.1 to 1.5 parts by weight and especially 0.2 to 1.0 part by weight.

The thermoplastic resin composition of the invention may be incorporated with other antioxidants in addition to the phosphorus antioxidant (D) as described above. Examples of these other antioxidants which can be used with the phosphorus antioxidant (D) include phenolic antioxidants, sulfur antioxidants and amine antioxidants.

Examples of the phenolic antioxidant used in the invention include 3,9-bis {2-[3-(3-tert-butyl-4-hydroxy-5-methylphenyl)propionyl]-1,1-dimethylethyl}-2,4,8,10-tetraoxaspiro[5.5]undecane, 2,6-di-tert-butyl-p-cresol, 2,6-di-tert-butyl-p cresol, 2,4,6-tri-tert-butylphenol, n-octadecyl-3-(4'-hydroxy-3', 5'-di-tert-butylphenyl)propionate, styrenized phenol, 4-hydroxymethyl-2,6-di-tert-butylphenol, 2,5-di-tert-butylhydroquinone, cyclohexylphenol, butylhydroxyanisole, 2,2'-methylenebis(4-methyl-6-tert-butylphenol),2,2'-methylenebis(4-ethyl-6-tert-butylphenol), 4,4'-isopropylidenebisphenol, 4,4'-butylidenebis (3-methyl-6-tert-butylphenol), 1,1-bis (4-hydroxyphenyl) cyclohexane, 4,4'-methylenebis(2,6-di-tert-butylphenol), 2,6-bis(2'-hydroxy-3'-tert-butyl-5'-methylbenzyl)-4-methylphenol, 1,1,3-tris(2-methyl-4-hydroxy-5-tert-butylphenyl)butane, 1,3,5-trismethyl-2,4,6-tris(3,5-di-tert-butyl-4-hydroxybenzyl)benzene, tetrakis [methylene 3-(3,5-di-tert-butyl-4-hydroxyphenylpropionate]methane, tris(3,5-di-tert-butyl-4 -hydroxyphenyl) isocyanurate, tris [$\beta$-(3,5-di-tert-butyl-4-hydroxyphenyl)-propionyloxyethyl] isocyanurate, 4,4'-thiobis(3-methyl-6-tert-butylphenol), 2,2'-thiobis(4-methyl-6-tert-butylphenol) 4,4'-thiobis(2-methyl-6-tert-butylphenol) and N,N'-hexamethylenebis(3,5-di-tert-butylphenol-4-hydroxycinnamamide.

Examples of the amine antioxidant include 4,4'-bis-($\alpha\alpha$-dimethylbenzyl)diphenylamine, phenyl- $\alpha$-naphthylamine, phenyl-$\beta$-naphthylamine, N, N'-diphenyl-p-phenylenediamine, N,N'-di-$\beta$-naphthyl-p-phenylenediamine, N-cyclohexyl-N'-phenyl-p-phenylenediamine, N-phenyl-N'-isopropyl-p- phenylenediamine, aldol- α-naphthylamine, polymer of 2,2,4-trimethyl-1,2-dihydroquinone and 6-ethoxy-2,2,4-trimethyl-1,2-dihydroquinoline.

Furthermore, examples of the sulfur antioxidant include thiobis(β-naphthol), thiobis (N-phenyl β-naphthyl-amine), 2-mercaptobenzothiazole, 2-mercaptobenzoimidazole, dodecylmercaptan, tetramethylthiuram monosulfide, tetramethylthiuram disulfide, nickel dibutyldithiocarbamate, nickel isopropylxanthate, dilauryl thiodirpopionate and distearyl thiodipropionate.

These other antioxidants can be used singly or in combination. Of these other antioxidants, particularly preferred is the use of phenolic antioxidants and amine antioxidants in combination.

These other antioxidants are used in an amount of usually not greater than 2 parts by weight, preferably 0.1 to 1.0 part by weight based on 100 parts by weight of the total amount of the components (A), (B) and (C).

Though the thermoplastic resin composition of the invention comprises the specific polyamide (A), graft modified copolymer (B), aliphatic polyamide (C) and phosphorus antioxidant (D) as described above, the composition of the invention may also be incorporated with additives such as inorganic fillers, organic fillers, thermal stabilizers, weathering stabilizers, antistatic agents, slip-preventive agents, antiblocking agents, antihaze agents, slip agents, pigments, dyestuffs, natural oil, synthetic oil and wax so long as the incorporation does not impair its properties.

Suitable examples of fibers used as the inorganic fillers include glass fibers, carbon fibers and boron fibers. Of these fibrous fillers, particularly preferred are glass fibers. The composition of the invention shows improved moldability when glass fibers are incorporated thereinto, and the molded articles obtained from the thermoplastic resin composition have improved mechanical properties such as tensile strength, flexural strength and flexural modulus, and improved heat properties such as a heat deformation temperature. The glass fibers as mentioned above have an average length of usually 0.1 to 20 mm, preferably 0.3 to 6 mm, an aspect ratio of usually 10 to 2000, preferably 30 to 600. It is preferable that those glass fibers having an average length and an aspect ratio in the ranges as mentioned above are used. Such glass fibers as described above are used in an amount of usually not greater than 200 parts by weight, preferably 5 to 180 parts by weight, more preferably 5 to 150 parts by weight based on 100 parts by weight of the resin component of the composition.

In addition to the inorganic fibrous fillers as mentioned above, there can be used in the present invention fillers having various forms such as a powder form, a granular form, a platy form, a needle-like form, a cloth form and a mat form. Examples of the fillers as mentioned above include inorganic compounds in a powder form or platy form, such as silica, silica alumina, alumina, titanium dioxide, talc, diatomaceous earth, clay, kaolin, glass, mica, gypsum, iron oxide red and zinc oxide;

inorganic compounds in a needle-like form, such as potassium titanate;

entirely aromatic polyamides such as poly-p-phenyleneterephthalamide, poly-m-phenyleneterephthalamide, poly-p-phenyleneisophthalamide, poly-m-phenyleneisophthalamide, a condensation product of diaminodiphenyl ether and terephthalic acid (or isophalic acid) and a condensation product of p-(or m)-aminobenzoic acid;

entirely aromatic polyamidoimides such as a condensation product of diaminodiphenyl ether and trimellitic anhydride or pyromellitic anhydride;

entirely aromatic polyesters;

entirely aromatic polyimides;

heterocyclic ring-containing compounds such as polybenzimidazole and polyimidazophenanthroline; and fabricated articles such as those formed from polytetrafluoroethylene in a powder form, a platy form, a fibrous form or a cloth form.

Of these fillers, preferable are fillers in a powder form, and particularly preferable is talc.

Two or more of these fillers may be used in combination. These fillers treated with a silane coupling agent or a titanium coupling agent may also be used. The fillers in a powder form have an average particle size of usually 0.1 to 200 μm, preferably 1 to 100 μm.

The fillers in a powder form are used in an amount of usually not greater than 200 parts by weight, preferably not greater than 100 parts by weight and especially 0.5 to 50 parts by weight based on 100 parts by weight of the resin composition.

The resin composition of the invention may also be used with heat-resistant resins. Examples of the heat-resistant thermoplastic resin include PPS (polyphenylene sulfide), PPE (polyphenyl ether), PES (polyether sulfone), PEI (polyether imide) and LCP (liquid crystal polymer), and still further include modified products of these resins. Polyphenylene sulfide is particularly preferable in the present invention. The resin composition of the invention contains such heat-resistant thermoplastic resin in an amount of usually less than 50% by weight, preferably 0 to 40% by weight.

Connectors excellent in heat resistance can be obtained when the resin composition contains the aliphatic polyamide (C) in an amount of usually 5 to 50 parts by weight, preferably 5 to 30 parts by weight based on 100 parts by weight of the above-mentioned aromatic polyamide (A), and the graft modified α-olefin polymer and/or graft modified aromatic vinyl hydrocarbon/conjugateddiene copolymer or hydrogenated product thereof (B) in an amount of usually 15 to 70 parts by weight, preferably 25 to 50 parts by weight based on 100 parts by weight of the total amount of the aromatic polyamide (A) and aliphatic polyamide (C).

The thermoplastic resin composition of the invention can be prepared by mixing and melting the aromatic polyamide (A), the graft modified copolymer (B), the aliphatic polyamide (C), and optionally the phosphorus antioxidant (D), and if necessary additives and other resins. For example, the aromatic polyamide (A), the graft modified copolymer (B) and the aliphatic polyamide (C) are melted, and a phosphorus antioxidant, such fillers as described above if necessary, and other resins if required are incorporated into the resultant molten mixture, followed by kneading to obtain the resin composition of the invention. In the above preparation, ordinary kneading apparatuses such as an extruder and a kneader can be employed.

When kneading is conducted as described above, the graft modified copolymer (B) and aliphatic polyamide (C) are usually finely dispersed in the aromatic polyamide (A) to form a so-called polymer alloy.

Molded articles having a desired shape can be formed from the thermoplastic resin composition by a conventional melt molding method such as a compression molding method, an injection molding method and an extrusion molding method.

For example, the resin composition of the invention is introduced to an injection molding machine having a cylinder preheated to about 350° to 300° C. in a molten state, and injected into a mold of a predetermined shape to obtain molded articles.

There is no particular limitation on the shape of molded articles manufactured from the thermoplastic resin composition of the invention. For example, electric tools, general industrial parts, machine parts such as gears and cams, and electronic parts such as printed circuit boards and housings for electronic parts are manufactured from the thermoplastic resin composition of the invention. Moreover, the resin composition of the invention is appropriate for a resin for molding automobile interior and exterior parts, engine room internal parts, automobile electrical parts, etc.

The thermoplastic resin composition of the invention is especially highly useful as a resin for manufacturing connectors which mutually connect electronic circuits. That is, those connectors formed from the resin composition as described above, for example, by an injection molding exhibit a lowered toughness decrease after heating them once, as well as excellent heat resistance. Recently, electronic parts provided with such connectors are often soldered by an IR-ray reflow method, etc., and conventional connectors sometimes lower their toughness when heated by an IR-ray reflow method, etc. The elongation of the connectors lowers due to the lowering of toughness, and as a result connecting operation (fitting operation) for mutually connecting the connectors cannot be smoothly performed sometimes. Moreover, when the connectors are used in automobile engine rooms, they lower their toughness because of repeated heating, and also lower their durability. Those connectors formed from the thermoplastic resin composition of the invention decrease their toughness lowering as described above, and maintain necessary elongation even when heated. As a result, connecting operation for connecting connectors mutually can be easily carried out, and the durability of the connectors is also improved.

EFFECT OF THE INVENTION

The present invention provides a novel thermoplastic resin composition excellent in heat resistance, water absorption resistance, moldability, etc.

Molded articles formed from the thermoplastic resin composition are excellent in heat resistance, and especially the elongation difference between the molded articles not heated and the molded articles once heated is small. That is to say, molded articles showing a low toughness decrease when heated can be obtained.

Furthermore, when a phosphorus antioxidant is incorporated in the resin composition, the impact strength of the molded articles formed from the resin composition is improved.

The thermoplastic resin composition of the invention can be appropriately used as a thermoplastic resin for molding connectors by utilizing such properties as mentioned above.

The thermoplastic resin composition for connectors of the invention comprises an aromatic polyamide, a specific graft modified copolymer, an aliphatic polyamide and optionally a phosphorus antioxidant in a specific proportion, and therefore the decrease in toughness of the connectors becomes small even when the connectors are exposed to a high temperature, for example, 150° C. or more over a long period of time.

Accordingly, the decrease in toughness of connectors formed from such a resin composition becomes small even when the connectors are exposed to a considerably high temperature, for example, when soldering by an IR-ray reflow method, etc. The connectors therefore can be satisfactorily installed in devices, and contact failure is difficult to occur.

When the resin composition of the invention is used for connectors, connectors having good toughness as described above can be manufactured. The connectors formed from the resin composition of the invention are also excellent in mechanical strength and low water absorption which the aromatic polyamide inherently has.

The present invention is illustrated below with reference to examples, but it should be construed that the present invention is in no way limited to these examples.

Synthesis Example 1

Three different kinds of aromatic polyamides (polyamide A, polyamide B, polyamide C) were produced as described below.

Production of aromatic polyamide A

Into a reactor having a capacity of 1 liter were introduced 254 g (2.19 mols) of 1,6-diaminohexane, 247 g (1.49 mols) of terephthalic acid, 106 g of isophthalic acid, 0.45 g ($4.25 \times 10^{-3}$ mol) of sodium hypophosphite as a catalyst and 148 ml of ion-exchanged water, and they were reacted with for an hour at 250° C. and a pressure of 35 kg/cm$^2$ after purging the reactor with nitrogen. The molecular ratio of terephthalic acid to isophthalic acid was 70:30.

After one hour, the reaction product thus formed was taken out of the reactor into a receiving vessel connected to the reactor kept at a pressure lower than that of the reactor by approx. 10 kg/cm$^2$ to obtain 545 g of a polyamide precursor having an intrinsic viscosity [$\eta$] of 0.10 dl/g as measured in conc. sulfuric acid at 30° C. (the viscosity being measured by the same procedure hereinafter unless otherwise noted).

The polyamide precursor thus obtained was dried, and the dried polyamide precursor was subjected to melt polymerization at a cylinder temperature of 330° C. using a twin-screw extruder to obtain an aromatic polyamide A.

The content of terephthalic acid units is 70 mol % and that of isophthalic acid units is 30 mol %.

The physical properties of the aromatic polyamide are as follows: an intrinsic viscosity of 1.1 dl/g, a melting point of 325° C. and a glass transition temperature of 125° C.

Production of aromatic polyamide B

The procedure for the production of aromatic polyamide A was repeated except that adipic acid was used in place of isophthalic acid with a molecular ratio of terephthalic acid to adipic acid of 55:45 to obtain an aromatic polyamide B.

The content of terephthalic acid units is 55 mol % and that of adipic acid units is 45 mol %.

The physical properties of aromatic polyamide B are as follows: an intrinsic viscosity of 1.1 dl/g, a melting point of 312° C. and a glass transition temperature of 80° C.

Production of aromatic polyamide C

The procedure for the production of aromatic polyamide A was repeated except that sebacic acid was additionally used with a molecular ratio of terephthalic acid to isophthalic acid to sebacic acid of 70:20:10 to obtain aromatic polyamide C.

The content of terephthalic acid units is 70 mol %, that of isophthalic acid units is 20 mol %, and that of sebasic acid recurring units is 10 mol %.

The physical properties of aromatic polyamide C are as follows: an intrinsic viscosity of 1.05 dl/g, a melting point of 316° C. and a glass transition temperature of 110° C.

Synthesis Example 2

Four different kinds of modified (co)polymers (modified elastic copolymer A, modified elastic copolymer B, modified elastic copolymer C, modified elastic copolymer D) were prepared as described below.

Production of modified polymer A

To 5 kg of pellets of a high density polyethylene having an intrinsic viscosity $[\eta]$ of 3.74 dl/g were added 50 g of maleic anhydride dissolved in 25 g of acetone and 2 g of an organic peroxide (trade name of Perhexene 25B, manufactured by Nihon Yushi K.K.), and the contents were sufficiently mixed. The mixture was reacted in a molten state at a cylinder temperature of 250° C. and pelletized using a twin-screw extruder (trade name of PCM45, manufactured by Ikegai Tekko K.K.).

The resin thus obtained contained 0.96% by weight of grafted maleic anhydride.

Production of modified copolymer rubber B

An ethylene/propylene copolymer rubber in which ethylene and propylene were copolymerized in an ethylene-to-propylene molecular ratio of 81:19 was prepared by a conventional method. The copolymer had an intrinsic viscosity $[\eta]$ of 2.19 dl/g as measured in decalin at 135° C.

The ethylene/propylene copolymer rubber was reacted with maleic anhydride to obtain a maleic anhydride-graft modified ethylene/propylene copolymer rubber containing 0.77% by weight of grafted maleic anhydride.

Production of modified copolymer rubber C

An ethylene/propylene/ethylidenenorbornene copolymer rubber having an ethylene recurring unit content of 78 mol %, a Mooney viscosity of 90 and an iodine value of 13 g/100 g was reacted with maleic anhydride to obtain a maleic anhydride-graft modified ethylene/propylene/ethylidenenorbornene copolymer rubber containing 0.86% by weight of grafted maleic anhydride.

Production of modified copolymer D

A hydrogenated styrene/butadiene/styrene block copolymer (trade name of Kraton G1652, manufactured by Shell Chemical Co., Ltd., containing 29% by weight styrene recurring units) obtained by hydrogenating a styrene/butadiene/styrene block copolymer was copolymerized with maleic anhydride to obtain a maleic anhydride-graft modified hydrogenated styrene/butadiene/styrene block copolymer containing 1.94% by weight of grafted maleic anhydride.

Synthesis Example 3

Nylon 6 (NY 6, trade name of CM1021, manufactured by Toray K.K.), Nylon 11 (NY 11, trade name of Rinsan BMNO, manufactured by Toray K.K.) and Nylon 610 (NY 610, manufactured by Daicel Hulles K.K.) were prepared as commercially available aliphatic polyamides (nylon) for the following examples.

EXAMPLE 1

A mixture of 60 parts by weight of polyamide A produced in Synthesis Example 1, 20 parts by weight of graft modified-copolymer B produced in Synthesis Example 2 and 20 parts by weight of nylon 11 (NY 11) described in Synthesis Example 3 was kneaded, and pelletized.

Test pieces of ASTM type IV 2 mm in size were formed from the pellets thus obtained, and tensile strength at break (TS) and elongation at break (namely, toughness, EL) were measured on these test pieces.

Subsequently, test pieces formed by the same procedure as mentioned above were heated at 150° C. for 24 hours, and tensile strength at break (TS) and elongation at break (namely, toughness, EL) were measured.

The results are shown in Table 1.

EXAMPLE 2

Example 1 was repeated except that the mixing amounts of polyamide B, graft modified-copolymer B and nylon 11 (NY 11) were changed to 70 parts by weight, 20 parts by weight and 10 parts by weight, respectively, to obtain pellets. Test pieces were formed from the pellets, and tensile strength at break (TS) and elongation at break (EL) were measured on the test pieces.

The results are shown in Table 1.

EXAMPLE 3

Example 2 was repeated except that modified polymer A was used in place of graft modified copolymer B to obtain pellets. Test pieces were formed from the pellets, and tensile strength (TS) and elongation at break (El) were measured on the test pieces.

The results are shown in Table 1.

Reference Example 1

A mixture of 80 parts by weight of polyamide B produced in Synthesis Example 1 and 20 parts by weight of modified polymer A formed in Synthesis Example 2 was kneaded, and pelletized. Test pieces were formed from the pellets thus obtained, and measurements of tensile strength at break (TS) and elongation at break (EL) were measured on these test pieces. The heat resistance of the resin compositions prepared in Examples 1 to 3 and Comparative Examples 1 to 4 were evaluated based on the tensile strength at break (TS) and elongation at break (EL) of these test pieces.

The results are shown in Table 1.

Comparative Examples 1 to 4

Example 1 was repeated except that polyamide B and nylons mentioned in Synthesis Example 3 were mixed in the proportions described below without using graft modified copolymer B to obtain pellets. Test pieces were prepared from the pellets, and tensile strength at break (TS) and elongation at break (EL) were measured on the test pieces.

| | | |
|---|---|---|
| Comparative Ex. 1 | polyamide B: | 80 parts by weight |
| | NY 11: | 20 parts by weight |
| Comparative Ex. 2 | polyamide B: | 80 parts by weight |
| | NY 610: | 20 parts by weight |
| Comparative Ex. 3 | polyamide B: | 60 parts by weight |
| | NY 11: | 40 parts by weight |
| Comparative Ex. 4 | polyamide B: | 60 parts by weight |
| | NY 610: | 40 parts by weight |

The results are shown in Table 1.

TABLE 1

| | Before heat treatment | | After heat treatment | |
|---|---|---|---|---|
| | TS (kg/cm$^2$) | EL (%) | TS (kg/cm$^2$) | EL (%) |
| Example 1 | 540 | 68 | 550 | 54 |
| Example 2 | 560 | 54 | 570 | 46 |
| Example 3 | 630 | 40 | 660 | 30 |
| Reference Example 1 | 670 | 54 | 710 | 25 |
| Comparative Example 1 | 760 | 32 | 870 | 17 |
| Comparative Example 2 | 890 | 40 | 920 | 12 |
| Comparative Example 3 | 730 | 39 | 740 | 25 |
| Comparative Example 4 | 790 | 68 | 850 | 29 |

EXAMPLE 4

A mixture of 60 parts by weight of polyamide A produced in Synthesis Example 1, 20 parts by weight of graft modified copolymer B produced in Synthesis Example 2 and 20 parts by weight of nylon 11 (NY 11) mentioned in Synthesis Example 3 was kneaded, and pelletized.

Test pieces were formed from the thus obtained pellets by a procedure similar to that in Example 1. Tensile strength at break (TS) and elongation at break (namely, toughness, El) were measured on the test pieces.

Subsequently, test pieces formed by the same procedure as mentioned above were heated at 150° C. for 24 hours, and tensile strength at break (TS) and elongation at break (namely, toughness, EL) were measured.

The results are shown in Table 2.

EXAMPLE 5

Example 4 was repeated except that the amounts of polyamide A, graft modified copolymer B and nylon 11 (NY 11) were changed to 70 parts by weight, 20 parts by weight and 10 parts by weight, respectively, to obtain pellets. Test pieces were formed from the thus obtained pellets by a procedure similar to that in Example 1. Tensile strength at break (TS) and elongation at break (EL) were measured on the test pieces.

The results are shown in Table 2.

Reference Example 2

A mixture of 80 parts by weight of polyamide A produced in Synthesis Example 1 and 20 parts by weight of modified polymer B produced in Synthesis Example 2 was kneaded and pelletized. Test pieces were formed from the pellets thus obtained. Tensile strength at break (TS) and elongation at break (EL) were measured on the test pieces. The heat resistance of the compositions prepared in Examples 4 to 5 and Comparative Example 5 was evaluated based on the tensile strength at break (TS) and elongation at break (EL) of these test pieces.

The results are shown in Table 2.

Comparative Example 5

Example 4 was repeated except that a mixture of 80 parts by weight of polyamide A and 20 parts by weight of nylon 11 mentioned in Synthesis Example 3 without containing graft modified copolymer B was used to obtain pellets. Test pieces were formed from the pellets thus obtained. Tensile strength at break (TS) and elongation at break (EL) were measured on these test pieces.

The results are shown in Table 2.

TABLE 2

| | Before heat treatment | | After heat treatment | |
|---|---|---|---|---|
| | TS (kg/cm$^2$) | EL (%) | TS (kg/cm$^2$) | EL (%) |
| Example 4 | 580 | 63 | 620 | 25 |
| Example 5 | 590 | 50 | 660 | 22 |
| Reference Example 2 | 730 | 50 | 870 | 15 |
| Comparative Example 5 | 980 | 40 | 1120 | 9 |

It is clear from comparison of the data in Examples, Comparative Examples and Reference Example listed in Table 1 and Table 2 that lowering of elongation at break of molded articles, comprising the thermoplastic resin composition of the invention (such as connectors), caused by heating can be decreased. Accordingly, the connectors molded from the resin composition of the invention tend not to lower their good elasticity and maintain necessary toughness even when heated.

EXAMPLES 6 to 11

Comparative Examples 6 to 8

Polyamides (polyamide A, B, C) prepared in Synthesis Example 1, graft modified copolymers (graft modified copolymer A, B, C, D) mentioned in Synthesis Example 2, nylon 6 (NY 6) and nylon 11 (NY 11) mentioned in Synthesis Example 3 and antioxidants mentioned below in the proportions listed in Table 3 were mixed, kneaded and pelletized to obtain pellets of resin compositions.

Antioxidants used are as follows:

phosphorus antioxidant A: tetrakis (2,4-di-tert-butylphenyl)-4,4'-bisphenylene diphosphonite (trade name of Mark Sandostab P-EPQ, manufactured by Sandot. Co., Ltd.);

phosphorus antioxidant B: bis (2,6-di-tert-butyl-4methylphenyl)pentaerythritol diphosphite (trade name of Mark PEP-36, manufacture by Asahi Denka K.K.);

an amine antioxidant: 4,4'-bis(α,α-dimethylbenzyl)diphenylamine (trade name of Norac CD, manufactured by Ouchi Shinkokagaku K.K. ); and a phenolic antioxidant: 3, 9-bis{2- [3-(3-tert-butyl—4-hydroxy-5-methylphenyl)propionyl]1,1-dimethylethyl}-2,4,8,10-tetraoxaspiro[5,5]undecane (trade name of Sumilizer GA-80, manufactured by Sumitomo Kagaku K.K.).

Test pieces were formed from the pellets thus obtained, and tensile strength, elongation at break, Izot impact strength at 23° C. (notched), flexural strength, flexural modulus and heat distortion temperature were measured on the test pieces. Tensile strength and elongation at break were also measured on test pieces by a procedure similar to that described above and heating the test pieces thus obtained at 150° C. for 24 hours. The measurements were carried out by procedures as described below.

The tensile-strength (TS) was measured according to ASTM D 638.

The elongation at break (EL) was measured according to ASTM D 638.

The Izod impact strength of notched test pieces was measured at 23° C. according to ASTM D 256.

The flexural strength was measured according to ASTM D 790.

The flexural modulus was measured according to ASTM D 790.

The heat distortion temperature (HDT) was measured according to ASTM D 648.

The results are shown in Table 3.

TABLE 3

|  | Ex. 6 | Ex. 7 | Ex. 8 | Ex. 9 | Ex. 10 | Ex. 11 |
|---|---|---|---|---|---|---|
| Polyamide A | — | — | 70 | — | — | — |
| Polyamide B | 75 | 75 | — | 75 | 75 | — |
| Polyamide C | — | — | — | — | — | 70 |
| Graft modified polymer A | — | — | — | — | 10 | — |
| Graft modified copolymer B | 20 | — | 20 | — | — | 20 |
| Graft modified copolymer C | — | 20 | — | — | — | — |
| Graft modified copolymer D | — | — | — | 15 | 10 | — |
| Polyamide NY 6 | — | 5 | — | — | — | 10 |
| Polyamide NY 11 | 5 | — | 10 | 10 | 5 | — |
| Phosphorus type antioxidant A | — | — | — | 0.5 | 0.5 | 0.5 |
| Phosphorus type antioxidant B | 0.5 | — | 0.5 | — | — | — |
| Amine type antioxidant | — | — | — | — | 0.5 | — |
| Phenolic antioxidant | — | — | 0.5 | 0.5 | — | — |
| TS (kg/cm$^2$) | 560 | 620 | 590 | 610 | 610 | 740 |
| EL (%) | 54 | 44 | 55 | 65 | 46 | 65 |
| Flexural strength (kg/cm$^2$) | 700 | 810 | 850 | 900 | 910 | 1130 |
| Flexural modulus (kg/cm$^2$) | 17000 | 19800 | 20900 | 21300 | 21000 | 26100 |
| Impact strength (kg/cm · cm) | 81 | 105 | 14 | 23 | 19 | 14 |
| HDT (°C.) | 81 | 93 | 96 | 87 | 92 | 91 |
| After heat treatment |  |  |  |  |  |  |
| TS (kg/cm$^2$) | 570 | 650 | 630 | 640 | 630 | 760 |
| EL (%) | 48 | 35 | 30 | 48 | 31 | 43 |

What is claimed:

1. An electric connector formed from a thermoplastic resin composition comprising
    (A) a partly aromatic polyamide consisting essentially of
        dicarboxylic acid units comprising 50-100 mol % of units derived from terephthalic acid, and 0-50 mol % of units derived from an aromatic dicarboxylic acid other than terephthalic acid and/or an aliphatic dicarboxylic acid having 4-20 carbon atoms, and
        diamine units derived from an aliphatic diamine and/or an alicyclic diamine,
        said aromatic polyamide having an intrinsic viscosity of 0.5-3.0 dl/g as measured in conc. sulfuric acid at 30° C. and a melting point of higher than 300° C.,
    (B1) a graft modified hydrogenated aromatic vinyl hydrocarbon/conjugated diene copolymer, which is graft modified with an unsaturated carboxylic acid anhydride, and
    (C) an aliphatic polyamide formed by ring-opening polymerization of lactam or from aminocarboxylic acid,
    wherein said thermoplastic resin composition comprises 10-80 parts by weight of the graft modified hydrogenated aromatic vinyl hydrocarbon/conjugated diene copolymer (B1) and 5-40 parts by weight of the aliphatic polyamide (C), based on 100 parts by weight of the aromatic polyamide (A).

2. An electric connector formed from a thermoplastic resin composition comprising
    (A) a partly aromatic polyamide consisting essentially of
        dicarboxylic acid units comprising 50-100 mol % of units derived from terephthalic acid, and 0-50 mol % of units derived from an aromatic dicarboxylic acid other than terephthalic acid and/or an aliphatic dicarboxylic acid having 4-20 carbon atoms, and
        diamine units derived from an aliphatic diamine and/or an alicyclic diamine,
        said aromatic polyamide having an intrinsic viscosity of 0.5-3.0 dl/g as measured in conc. sulfuric acid at 30° C. and a melting point of higher than 300° C.,
    (B1) a graft modified hydrogenated aromatic vinyl hydrocarbon/conjugated diene copolymer, which is graft modified with an unsaturated carboxylic acid anhydride,
    (B2) a graft modified crystalline α-olefin polymer, which is graft modified with an unsaturated carboxylic acid anhydride, and
    (C) an aliphatic polyamide formed by ring-opening polymerization of lactam or from aminocarboxylic acid,
    wherein said thermoplastic resin composition comprises 10-80 parts by weight of the graft modified crystalline α-olefin polymer (B1) and the graft modified hydrogenated aromatic vinyl hydrocarbon/conjugated diene copolymer (B2), and 5-40 parts by weight of the aliphatic polyamide (C), based on 100 parts by weight of the aromatic polyamide (A).

3. The electric connector claimed in claim 1, wherein said thermoplastic resin composition further comprises
    (D) a phosphorus antioxidant
    in an amount of 0.05-2 parts by weight based on 100 parts by weight of the total sum of the components (A), (B1) and (C).

4. The electric connector claimed in claim 2, wherein said thermoplastic resin composition further comprises
    (D) a phosphorus antioxidant
    in an amount of 0.05-2 parts by weight based on 100 parts by weight of the total sum of the components (A), (B1), (B2) and (C).

* * * * *

UNITED STATES PATENT AND TRADEMARK OFFICE
CERTIFICATE OF CORRECTION

PATENT NO. : 5,424,104
DATED : June 13, 1995
INVENTOR(S) : Yoshikatsu AMIMOTO, et al.

It is certified that error appears in the above-indentified patent and that said Letters Patent is hereby corrected as shown below:

On the title page, in item "[73] Assignee:", delete "Mitsui Petrochemical Industries, Ltd., Tokyo, Japan" and insert therefor --Mitsui Petrochemical Industries, Ltd. and Yazaki Corporation, both of Tokyo, Japan--.

Signed and Sealed this

Twelfth Day of December, 1995

Attest:

BRUCE LEHMAN

*Attesting Officer*  *Commissioner of Patents and Trademarks*